Patented Nov. 16, 1937

2,099,214

UNITED STATES PATENT OFFICE 2,099,214

PROCESS FOR FORMING THE SULPHURIC ESTERS OF UNSATURATED HIGHER ALCOHOLS

Walter H. McAllister, Wyoming, Ohio, assignor to The Procter & Gamble Company, Cincinnati, Ohio, a corporation of Ohio No Drawing. Application October 17, 1935, Serial No. 45,503

13 Claims. (Cl. 260—99.12)

This invention relates to an improved process for forming the sulphuric esters of unsaturated higher alcohols.

One object is to produce such sulphate esters without saturating the double bond.

Another object is the production of substances having superior wetting, sudsing and detergent properties.

In the prior art, it has been impossible to esterify the hydroxyl group of alcohols having an unsaturated chemical structure and form sulphuric esters without at the same time reacting to some extent with the double bond of such compounds, when using any of the commonly known procedures and commonly known sulphating agents such as sulphuric acid, fuming sulphuric acid, sulphur trioxide, chlorsulphonic acid, etc. This desirable object has hitherto been achieved usually by rather difficult and expensive procedures, such for example as using sulphating agents in the presence of amines. Any means, therefore, that would permit the sulphation of the hydroxyl group by preference without at the same time acting on the double bond and in this way obtain the desired product in a simple and economical manner would be very advantageous, since alcohols sulphated only at the hydroxyl group are better detergents than when sulphated at the double bond.

I have found that this result can be accomplished by sulphating the unsaturated alcohols with a new reagent consisting of the addition product of sulphur trioxide and dioxane. This addition product is described, and its uses as a sulphating or sulphonating reagent are described, in a co-pending application by Chester Merle Suter, Serial Number 45,505, filed October 17, 1935. When $SO_3$ is added to 1,4-dioxane, a reaction occurs and either one molecule or two molecules of $SO_3$ may be added. The reaction may be illustrated by the following equations:

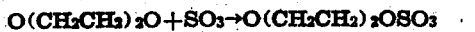

The amount of sulphur trioxide present in the reagent may vary between forty-seven and sixty-five per cent.

Chlorsulphonic acid may be substituted for sulphur trioxide in making a suitable reagent with dioxane for carrying out the previously mentioned reaction with unsaturated alcohols, and the same sulphated alcohol products are obtained as when the $SO_3$ compound with dioxane is used.

I have found that with the use of this type of reagent on unsaturated higher alcohols, such as oleyl alcohol for example, the hydroxyl group reacts preferentially and the sulphate ester is formed with little or no action on the double bond. This peculiar property was not noted by Suter who taught the use of a large excess of the reagent, in which case the double bond is acted upon also.

My reaction is carried out at low temperatures, preferably below 30° C., using substantially stoichiometrical proportions, and preferably in the presence of a suitable solvent such as carbon tetrachloride or petroleum ether. The solvent and the dioxane are readily removed from the sulphated product by distillation. The products thus formed are found to be the sulphuric esters of the unsaturated alcohols with the double bond still substantially unsaturated. These products can readily be neutralized with alkalies, forming substances having excellent wetting, sudsing and detergent properties, superior in important respects to the corresponding saturated compounds. The salts thus formed will contain but relatively small proportions of impurities resulting from the process of manufacture, such as sodium sulphate or sodium chloride, if substantially stoichiometrical proportions are used, but they may be purified if desired by evaporating to complete dryness, dissolving in absolute ethyl alcohol, filtering from inorganic salts and other insoluble matter, and crystallizing.

The term "suitable solvent" as used herein denotes a solvent that dissolves both dioxane and the substance to be sulphated or sulphonated, and that does not react with the reagent with sufficient rapidity to interfere with its use.

The following examples will illustrate my invention.

*Example 1.*—27 parts sulphur trioxide were first added to 45 parts of dioxane in 500 parts of carbon tetrachloride. To this mixture was added 87 parts of commercial "Ocenol". (Ocenol is a commercial mixture of alcohols obtained from sperm oil, most of which are unsaturated, and the principal alcohol present is oleyl alcohol. This material had an iodine value of 86 and hydroxyl value of 209). This mixture was stirred for half an hour below 30° C., after which most of the dioxane and carbon tetrachloride were removed by distillation under vacuum at 50 to 60° C. The remaining product was then neutralized by stirring into an aqueous solution of sodium hydroxide.

*Example 2.*—56.5 parts of chlorsulphonic acid were added to 90 parts of dioxane and 400 parts of petroleum ether. To this was added 106 parts of "Ocenol" (see Example 1). The mixture was stirred for half an hour at a temperature of 0-10° C., and then most of the dioxane and petroleum ether were removed by heating under a vacuum at 50 to 60° C. The remaining product was then neutralized by stirring into an aqueous solution of sodium hydroxide.

In both of the above examples, a slight excess of sulphating agent was used.

The active ingredients in the product obtained in the above two examples were identical in chemical composition and in properties. They had excellent detergent properties, which, in fact, were definitely superior to those of a product prepared by treating the Ocenol with the same sulphating agent in the absence of dioxane, either with or without the use of a solvent. It was clearly evident that the Suter sulphating agent produced a type of product different from that obtainable by ordinary sulphating procedures, the difference being unquestionably due to the application of my discovery of the preferential action of this reagent obtained by reacting sulphur trioxide or chlorsulphonic acid with dioxane, and using this as the sulphating agent. The iodine value of the alcohols decreased only slightly during the sulphating, thus indicating clearly that the double bond was substantially unattacked, whereas by ordinary sulphating procedures of the prior art the iodine value was always reduced markedly.

This invention is not limited in its application to oleyl alcohol or to commercial Ocenol, but is also applicable to other unsaturated higher aliphatic alcohols. By higher alcohols, I mean those containing from about eight to about twenty-two carbon atoms per molecule. It offers a new and efficient method of producing, at reasonably low costs, the sulphated higher alcohols having an unsaturated bond, which compounds are found to have superior properties to the corresponding saturated compounds in many respects, particularly as to solubility and detergency.

What I claim is:—

1. The process of making a sulphuric ester of an unsaturated higher aliphatic alcohol, which comprises treating said higher alcohol with the addition product formed by treating dioxane with a sulphating agent selected from the group consisting of sulphur trioxide and chlorsulphonic acid, without substantially saturating the double bond.

2. The process of making a sulphuric ester of an unsaturated higher aliphatic alcohol, which comprises treating said higher alcohol with a reagent consisting essentially of sulphur trioxide with dioxane, without substantially saturating the double bond.

3. The process of making a sulphuric ester of an unsaturated higher aliphatic alcohol, which comprises treating said higher alcohol with a reagent consisting essentially of sulphur trioxide with dioxane having the formula $$O(CH_2CH_2)_2OSO_3$$

and containing about forty-seven per cent of $SO_3$, without substantially saturating the double bond.

4. The process of making a sulphuric ester of an unsaturated higher aliphatic alcohol, which comprises treating said higher alcohol with a reagent consisting essentially of sulphur trioxide with dioxane having the formula $$O_3SO(CH_2CH_2)_2OSO_3$$

and containing about sixty-five per cent of $SO_3$, without substantially saturating the double bond.

5. The process of making a sulphuric ester of an unsaturated higher aliphatic alcohol, which comprises treating said higher alcohol with the addition product formed by treating dioxane with a sulphating agent selected from the group consisting of sulphur trioxide and chlorsulphonic acid, without substantially saturating the double bond, said treatment of unsaturated higher alcohol being carried out in the presence of a suitable solvent capable of dissolving said higher alcohol and dioxane but substantially incapable of reacting with said sulphating agent.

6. The process of making a sulphuric ester of an unsaturated higher aliphatic alcohol, which comprises treating said higher alcohol with the addition product formed by treating dioxane with a sulphating agent selected from the group consisting of sulphur trioxide and chlorsulphonic acid, without substantially saturating the double bond, said treatment of the unsaturated higher alcohol being carried out in the presence of a suitable solvent at a temperature not higher than about 30° C., said solvent being capable of dissolving higher alcohol and dioxane but substantially incapable of reacting with said sulphating agent.

7. The process of making a sulphuric ester of an unsaturated higher aliphatic alcohol, which comprises treating said higher alcohol with the addition product formed by treating dioxane with a sulphating agent selected from the group consisting of sulphur trioxide and chlorsulphonic acid, without substantially saturating the double bond, said treatment of the unsaturated higher alcohol being carried out in the presence of carbon tetrachloride.

8. The process of making a sulphuric ester of an unsaturated higher aliphatic alcohol, which comprises treating said higher alcohol with the addition product formed by treating dioxane with a sulphating agent selected from the group consisting of sulphur trioxide and chlorsulphonic acid, without substantially saturating the double bond, said treatment of the unsaturated higher alcohol being carried out in the presence of petroleum ether.

9. The process of making a sulphuric ester of an unsaturated higher aliphatic alcohol, which comprises treating said unsaturated higher alcohol with the addition product formed by treating dioxane with a sulphating agent selected from the group consisting of sulphur trioxide and chlorsulphonic acid, without substantially saturating the double bond.

10. The process of making the sulphuric esters of unsaturated higher alcohols derived from sperm oil, which comprises treating said unsaturated higher alcohols with the addition product formed by treating dioxane with a sulphating agent selected from the group consisting of sulphur trioxide and chlorsulphonic acid, without substantially saturating the double bonds.

11. The process of forming the sulphuric ester of oleyl alcohol by treating same with the addition product of sulphur trioxide and dioxane in the presence of carbon tetrachloride at about 30° C., without reacting with the double bond.

12. The process of forming the sulphuric ester of oleyl alcohol by treating same with the addition product of chlorsulphonic acid and dioxane in the presence of petroleum ether at about 10° C., without reacting with the double bond.

13. The process of making a wetting, sudsing and detergent agent having an unsaturated chemical structure, comprising treating a higher unsaturated aliphatic alcohol with the addition product of dioxane and a sulphating agent selected from the group consisting of sulphur trioxide and chlorsulphonic acid, without reacting with the double bond, and, after said treatment, neutralizing the product with an alkali.

WALTER H. McALLISTER.